United States Patent Office 3,007,370
Patented Nov. 7, 1961

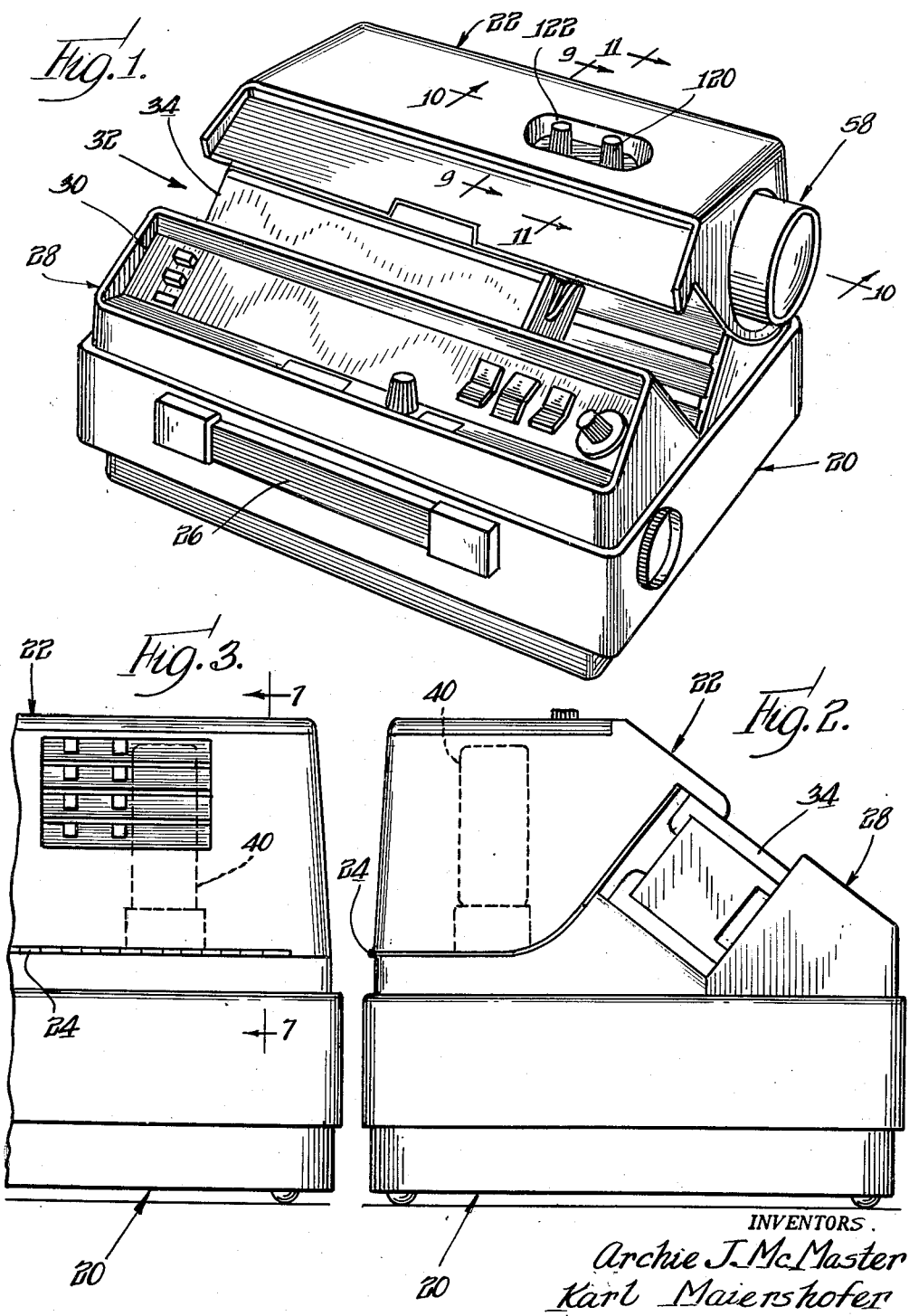

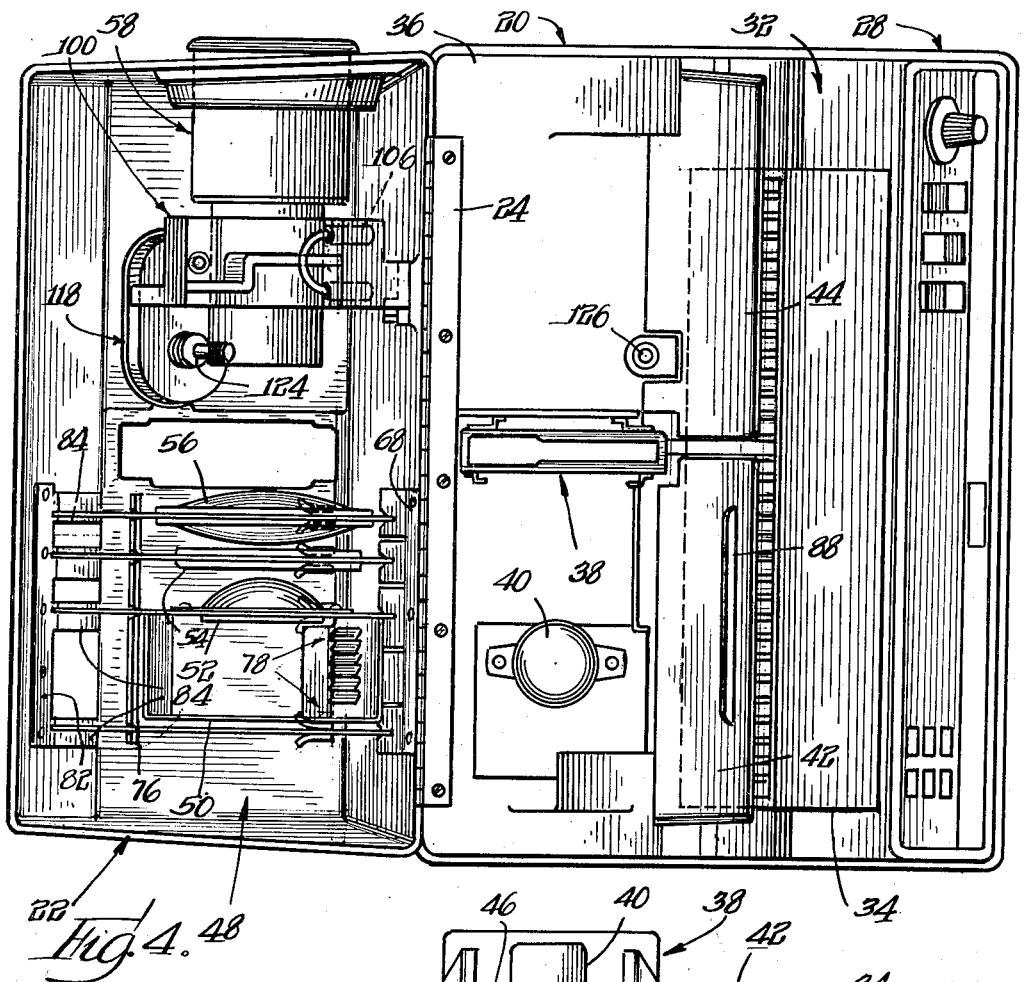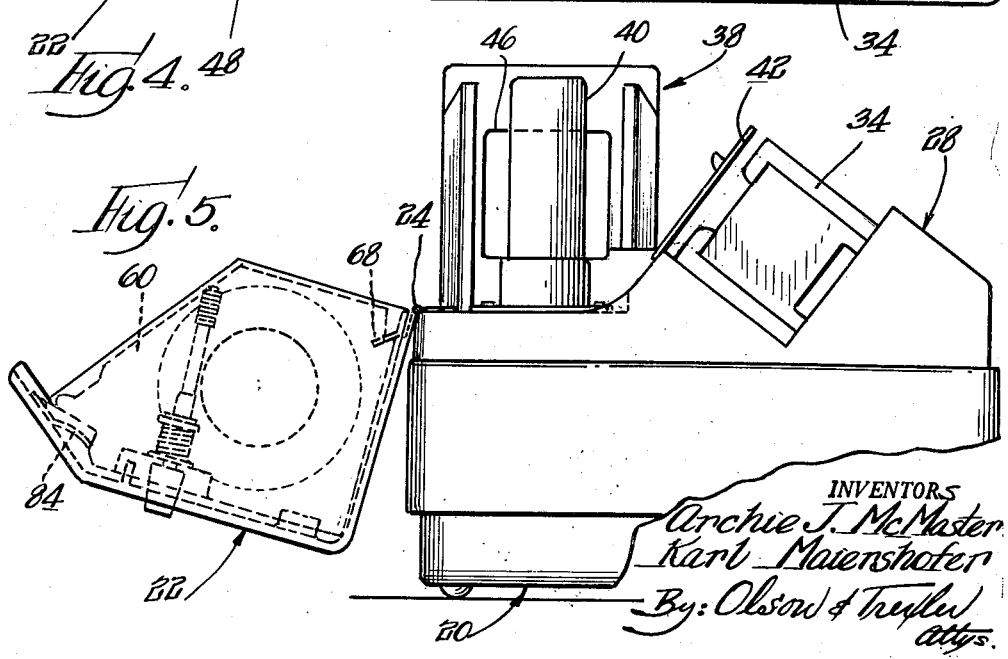

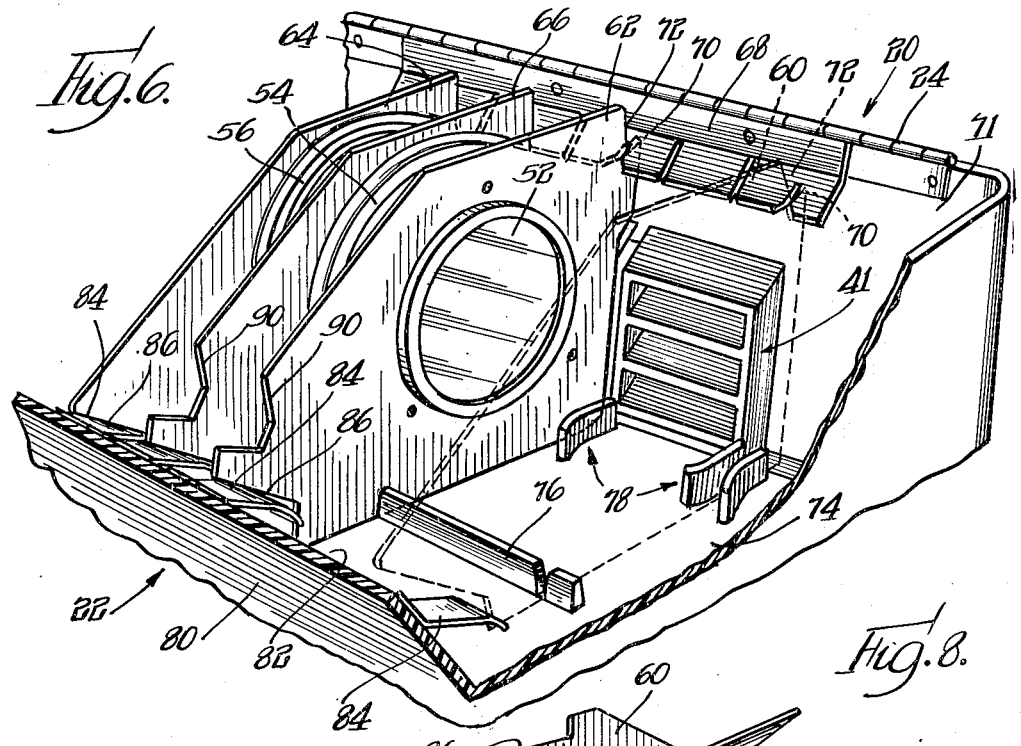

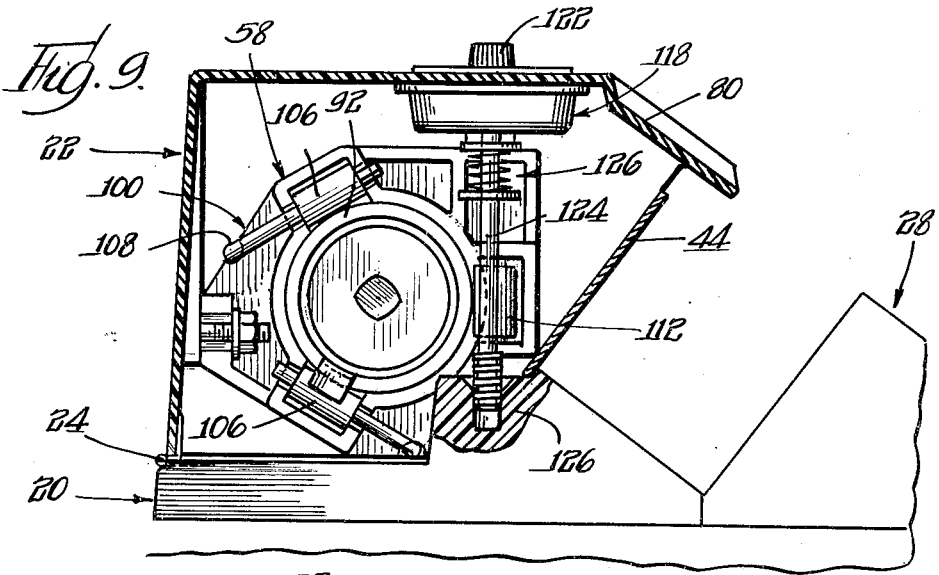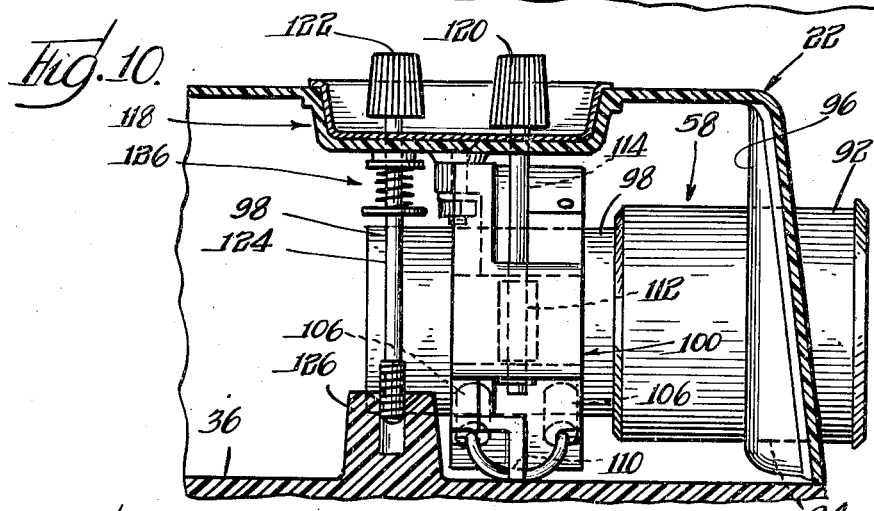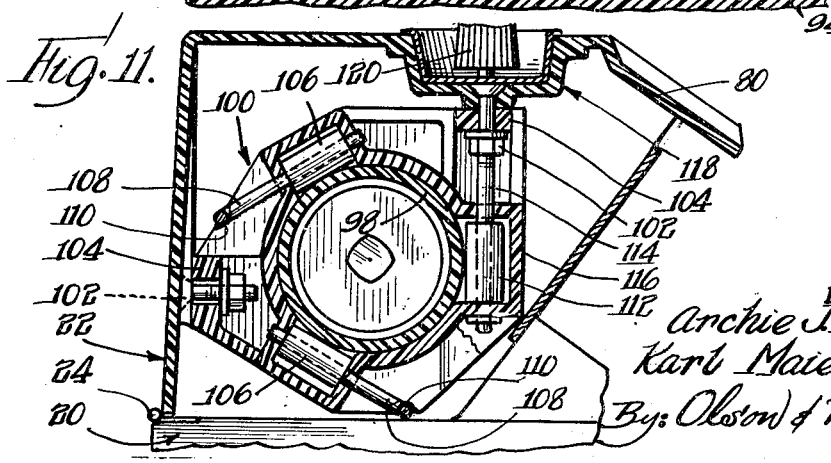

3,007,370
AUTOMATIC SLIDE PROJECTOR
Archie J. McMaster, Bannockburn, and Karl Maiershofer, Norridge, Ill., assignors to G-M Laboratories, Inc., Chicago, Ill., a corporation of Illinois
Filed Feb. 26, 1960, Ser. No. 11,342
7 Claims. (Cl. 88—26)

This invention relates generally to the art of projecting optical images and especially to automatically operated projectors for photographic slide transparencies.

Automatic slide projectors are commonly arranged to circulate air over the elements juxtaposed with the light source in order to prevent excessive heating of these elements. It has been found, however, that the friction generated by air currents passing over these elements causes them to develop a static electrical charge; and dust particles suspended in the air tend to be attracted to elements so charged.

Dust electrostatically adhered to these elements is known to cling tenaciously and to resist all ordinary removal efforts except careful wiping; and while dust particles collected on the optical elements of a slide projector tend to obscure the projected images, slide projectors have heretofore been conventionally constructed with optical elements permanently installed in sealed compartments or in highly inaccessible locations within the projector structure. Accordingly, a common problem in the use of prior art slide projectors has been the accumulation of dust on optical elements juxtaposed with a light source. The difficulty of cleaning dust-filmed lenses has existed as a concomitant problem.

Therefore, a general object of the present invention is to provide a new and improved slide projector arrangement.

Another object of the invention is to provide a slide projector arrangement which is characterized by ready access to the optical elements.

A further object of the invention is to provide a slide projector which incorporates an improved mounting arrangement for optical elements.

A still further object of the invention is to provide a slide projector having improved means for mounting and focusing the projection lens.

Additional objects and features of the invention pertain to the particular structure and arrangements whereby the above objects are attained.

A projector in accord with the invention includes a projector structure, housing means for receiving optical means swingably mounted on the projector structure, a slide mechanism upraised from the projector structure to be enclosed by the housing means in its closed position, a light source in optical alignment with the slide mechanism, and optical means individually and removably mounted in the housing means for cooperating with the light source in defining a projection system for a slide situated in the slide mechanism when the housing means is in its closed position, the optical means including a light baffle arrenged to be disposed bracketing the light source, condensing lens means mounted in support plate means and arranged to be disposed between the light source and the slide mechanism and an adjustable, projection lens assembly arranged to be disposed beyond the slide mechanism.

The invention, both to its structure and mode of operation, will be better understood by reference to the following disclosure and drawings forming a part thereof, wherein:

FIG. 1 is a perspective view of a slide projector constructed in accordance with the invention and showing the housing means in its closed position;

FIG. 2 is an enlarged, side-elevational view, partially in invisible outline, of the slide projector of FIG. 1;

FIG. 3 is a fragmentary, enlarged, rear-elevational view, partially in invisible outline, of the slide projector of FIG. 1;

FIG. 4 is a plan view of the slide projector of FIG. 1, showing the housing means swung back to reveal the projection system;

FIG. 5 is a side-elevational view of the showing of FIG. 4;

FIG. 6 is an enlarged, fragmentary, perspective view looking into the interior of the housing means;

FIG. 7 is an enlarged view taken through the section 7—7 of FIG. 3;

FIG. 8 is an enlarged, fragmentary, perspective view of the light baffle arrangement mounted in the housing means;

FIG. 9 is an enlarged view taken through the section 9—9 of FIG. 1;

FIG. 10 is an enlarged, fragmentary view taken through the section 10—10 of FIG. 1; and FIG. 11 is an enlarged view taken through the section 11—11 of FIG. 1.

Referring now in detail to the drawings wherein a single embodiment of the invention is shown and referring specifically to FIG. 1, a slide projector will be seen to include a projector structure 20 to which a lamphouse 22 is swingably mounted, as by a piano hinge 24 indicated in FIGS. 2 and 3.

With reference again to FIG. 1, the projector structure 20 incorporates a carrying handle 26 and an enclosure 28 carrying a control panel 30. Between the enclosure 28 and the lamphouse 22 there is defined a tunnel 32 which is adapted to receive slide trays such as the slide tray 34.

Turning now to FIG. 4, the projector structure 20 is seen to define a platform 36 from which extends a portion of a suitable slide changer mechanism 38 and a light source 40. Source 40 is preferably a projector lamp of the type having an internal reflector; and lamphouse 22 desirably includes a louvered opening 41, shown in FIG. 6, disposed opposite the source 40. Opening 41 may be readily provided by being die-cast as a part of lamphouse 22. Advantageously, baffle plates 42 and 44 are secured to the projector structure 20 adjacent the platform 36 in order to prevent light given off by the source 40 from entering the tray tunnel 32.

As is best shown in FIG. 5, the slide mechanism 38 is fashioned with an aperture 46 which is arranged in optical alignment with the light source 40 and which is adapted to frame the photographic transparency included in the various slides.

Again with reference to FIG. 4, the lamphouse 22 is seen to include a projection system 48 which includes a light baffle 50, a condensing lens 52, a heat absorbing element 54, a condensing lens 56 and a projection lens assembly 58. While the light baffle 50 is arranged to bracket the light source 40 when lamphouse 22 is in its closed position, the condensing lenses 52 and 56 combine to produce an image of the light source 40 at the entrance pupil of the projection lens which is part of projection lens assembly 58; and as is illustrated, lenses 52 and 56 and the heat absorbing element 54 are arranged to be disposed between the light source 40 and the slide mechanism 38 when the lamphouse 22 is in its closed position. It will also become apparent that, when the lamphouse 22 is in the closed position, the projection lens assembly 58 is disposed beyond the slide mechanism.

As is best shown in FIG. 6 in conjunction with FIG. 8, the light baffle 50, the condensing lenses 52 and 56 and the heat absorbing element 54 are individually mounted to support plates, plates 60, 62, 64 and 66 respectively. The several support plates are fashioned in the shape of a general polygon and are appropriately notched for fastening in the lamphouse 22.

Adjacent the piano hinge 24, there is affixed a bracket 68 which is appropriately provided with slots 70, slots 70 extending a fraction of the distance to wall 71. The slots 70 cooperate with notches 72 fashioned in the several support plates in providing one point of confinement for the plates; and as will become apparent, a corner of each plate is constrainable beneath the unslotted area of bracket 68.

On the floor 74 of lamphouse 22 there are arranged slot-defining means 76 and 78, the means 76 and 78 defining slots which are individually aligned with the slots 70 in order to provide two additional points of confinement for the support plates.

Along the internal surface of the overhanging portion 80 of lamphouse 22, there is affixed a bracket 82 bearing individual spring clips 84 which face the bracket 68 and wedgedly engage the notches 86 fashioned in the individual support plates. Each of the spring clips 84 is aligned with a corresponding slot 70 and the corresponding slots defined by the means 76 and 78. Thus, each of the support plates 60, 62, 64 and 66 is laterally confined by the respective slot-defining means and is frictionally secured within the lamphouse 22 by wedgedly engaging the respective spring clips 84.

When the plate 42 is formed with a louver 88, as shown in FIG. 7, the abutting support plates, plates 66 and 62 as shown, are advantageously notched at 90 so as not to interefre with the louver 88.

Considering now FIGS. 9–11 for a description of the manner of mounting and focusing the proejction lens assembly 58, the forward barrel portion 92 of projection lens assembly 58 is shown slidably mounted in a matching bore 94 provided in the end portion 96 of lamphouse 22. The concentric, rearward barrel portion 98 is slidably received in a generally cylindrical bracket 100 which is affixed to the walls of lamphouse 22 by means of nut-and-bolt fasteners 102. The fasteners 102 pass through appropriate bores in flanged portions 104 of bracket 100.

Within the bracket 100, the barrel portion 98 is supported on a number of roller bearings 106. These roller bearings may conveniently be fabricated from short lengths of thick-walled nylon tubing, for example, and are advantageously arranged in pairs coupled by a U-shaped, resilient shaft 108. Each of the shafts 108 is snapped into triangularly disposed notches 110 provided in the bracket 100. As will be recognized, roller bearings so adapted and arranged greatly facilitate their assembly to the bracket 100.

The two roller bearing units shown are spaced with a drive roller 112 equidistantly about the periphery of the barrel portion 98. Drive roller 112 is desirably fabricated from a material having a reasonably high coefficient of friction, such as rubber, and further is mounted on a shaft 114, shaft 114 being rotatably secured in appropriate bores provided in opposing arm portions of bracket 100.

Shaft 114 extends through a hollow, depending boss 118 to have an operating knob 120 secured to its free end; and as will become apparent, rotation of the knob 120 will rotate the drive roller 112 whose action on the barrel portion 98 will appropriately extend or retract the projection lens assembly 58 whereby to focus the same.

A lamphouse lock knob 122 is mounted on a shaft 124 extending through the boss 118 adjacent the operating knob 120. Shaft 124 extends through an oversized aperture in boss 118 and is flexibly positioned by means of the biasing arrangement 126 so as to provide a certain amount of play or positionability in the shaft 124. The end of shaft 124 is threaded in order to be engageable with the internal threads provided in the bushing 126 which is upraised from the platform 36 of projector structure 20. Thus, when lamphouse 22 is directed into its closed position, the threaded end of shaft 124 may be threaddly engaged with bushing 126; and rotation of the knob 122 is thereby capable of securely fastening the lamphouse 22 to the projector structure 20.

For purposes of providing an easy understanding of the invention, it is advantageous to provide at this juncture a functional description of the mode in which the component parts cooperate. When the slide projector of the invention is in use, it will, of course, be arranged with the lamphouse 22 secured in its closed position by means of the threaded engagement of shaft 124 and bushing 126. However, when it is desired to gain access to the projection system for replacing a burned-out light source or for cleaning dust-filmed optical elements, the lamphouse 22 may be readily swung open after lock knob 122 has been rotated to release shaft 124 from bushing 126.

With the lamphouse 22 swung back into the open position shown generally in FIG. 4, light source 40 may be easily replaced. Furthermore, the light baffle 50, the lenses 52 and 56, and the heat absorbing element 54 may be readily removed for cleaning by manually depressing the corresponding spring clip 84, grasping the support plate and lifting the support plate from the several slots described hereinabove. After these elements have been thoroughly cleaned, they may be replaced merely by aligning the support plate in its appropriate slots and pressing the plate into wedged engagement with the spring clip 84.

When the lamphouse 22 is in its closed position as indicated generally in FIG. 1, it may be desired to alter the focus of the projection lens assembly 58. This may be achieved by a simple, manual rotation of the knob 120; and as indicated hereinabove, this rotation of the knob 120 will be transferred to the drive roller 112 by the shaft 114. Due to the frictional engagement of roller 112 and barrel portion 98, the rotation of roller 112 will extend or retract the projection lens assembly 58, correspondingly altering the focus thereof. Since the roller bearings 106 rotate freely on their mounting shaft 108, this repositioning of the projection lens assembly 58 is achieved with minimal effort.

The specific example herein shown and described should be considered as illustrative only. Various changes in structure will, no doubt, occur to those skilled in the art; and these changes are to be understood as forming a part of this invention insofar as they fall within the true spirit and scope of the appended claims.

The invention is claimed as follows:

1. A slide projector comprising: a projector structure having two longitudinally extending surfaces which intersect at an outwardly opening angle; housing means for receiving optical means swingably mounted on said structure, said housing means being disposable into an open position for access and maintenance and into a closed position for use and transport; a slide mechanism upraised from said structure to be enclosed by said housing means in its closed position; a light source in optical alignment with said slide mechanism; and optical means mounted in said housing means for cooperating with said light source in defining a projection system for a slide situated in said slide mechanism when said housing means is in its closed position, said optical means including condensing lens means arranged to be disposed between said light source and said slide mechanism and an adjustable projection lens assembly arranged to be disposed beyond said slide mechanism.

2. A slide projector comprising: a projector structure having two longitudinally extending surfaces which intersect at an outwardly opening angle; housing means for receiving optical means swingably mounted on said structure adjacent said surfaces, said housing means being disposable into an open position for access and maintenance and into a closed position for use and transport, said housing means having a portion which confronts one of said surfaces in spaced relationship when said housing means is in said closed position, said portion and said surfaces defining a tunnel for receiving slide trays; a slide mechanism upraised from said structure and spaced-apart from said surfaces to be enclosed by said housing means in its closed position; a light source on said structure in optical alignment with said slide mechanism; and optical means individually and removably mounted in said housing means for cooperating with said light source in defining a projection system for a slide situated in said slide mechanism when said housing means is in its closed position.

3. A slide projector comprising: a projector structure; housing means for receiving optical means swingably mounted on said structure, said housing means being disposable into an open position for access and maintenance and into a closed position for use and transport; a slide mechanism upraised from said structure to be enclosed by said housing means in its closed position; a light source in optical alignment with said slide mechanism; and optical means mounted in said housing means for cooperating with said light source in defining a projection system for a slide situated in said slide mechanism when said housing means is in its closed position, said optical means including a light baffle arranged to be disposed bracketing said light source, condensing lens means arranged to be disposed between said light source and said slide mechanism and an adjustable projection lens assembly arranged to be disposed beyond said slide mechanism.

4. A slide projector comprising: a projector structure; housing means for receiving optical means swingably mounted on said structure, said housing means being disposable into an open position for access and maintenance and into a closed position for use and transport; a slide mechanism upraised from said structure to be enclosed by said housing means in its closed position; a light source in optical alignment with said slide mechanism; optical means individually and removably mounted in said housing means for cooperating with said light source in defining a projection system for a slide situated in said slide mechanism when said housing means is in its closed position, said optical means including a light baffle mounted to support plate means and arranged to be disposed bracketing said light source, condensing lens means mounted to support plate means and arranged to be disposed between said light source and said slide mechanism and an adjustable projection lens assembly arranged to be disposed beyond said slide mechanism; and spring clip means and slot-defining means on said housing means for releasably receiving said support plate means.

5. A slide projector comprising: a projector structure; housing means for receiving optical means swingably mounted on said structure, said housing means being disposable into an open position for access and maintenance and into a closed position for use and transport; a slide mechanism upraised from said structure to be enclosed by said housing means in its closed position; a light source in optical alignment with said slide mechanism; optical means individually and removably mounted in said housing means for cooperating with said light source in defining a projection lens system for a slide situated in said slide mechanism when said housing means is in its closed position, said optical means including a light baffle mounted to support plate means and arranged to be disposed bracketing said light source, condensing lens means and a heat absorbing element respectively mounted to support plate means and arranged to be disposed between said light source and said slide mechanism and an adjustable, projection lens assembly arranged to be disposed beyond said slide mechanism; and spring clip means and slot-defining means on said housing means for releasably receiving said plate means.

6. A slide projector comprising: a projector structure; housing means for receiving optical means swingably mounted on said structure, said housing means being disposable into an open position for access and maintenance and into a closed position for use and transport; a slide mechanism upraised from said structure to be enclosed by said housing means in its closed position; a light source in optical alignment with said slide mechanism; optical means mounted in said housing means for cooperating with said light source in defining a projection system for a slide situated in said slide mechanism when said housing means is in its closed position, said optical means including an adjustable, projecton lens assembly arranged to be disposed beyond said slide mechanism; bracket means on said housing means defining a sleeve for receiving said projection lens assembly; idler roller means spaced about said sleeve rotatably contacting said assembly; a drive roller frictionally engaging said assembly; and knob means for manually operating said drive roller to reposition said assembly and thereby focus the image of said slide.

7. A slide projector comprising: a projector structure; housing means for receiving optical means swingably mounted on said structure, said housing means being disposable into an open position for access and maintenance and into a closed position for use and transport; a slide mechanism upraised from said structure to be enclosed by said housing means in its closed position; a light source in optical alignment with said slide mechanism; optical means mounted in said housing means for cooperating with said light source in defining a projection system for a slide situated in said slide mechanism when said housing means is in its closed position, said optical means including an adjustable, projection lens assembly arranged to be disposed beyond said slide mechanism; bracket means on said housing means defining a sleeve for receiving said projection lens assembly; nylon idler roller means spaced about said sleeve for rotatably contacting said assembly; a rubber drive roller frictionally engaging said assembly; and knob means for manually operating said drive roller to reposition said assembly and thereby focus the image of said slide.

References Cited in the file of this patent

UNITED STATES PATENTS

| | | |
|---|---|---|
| 1,849,151 | Ott | Mar. 15, 1932 |
| 2,169,010 | Teague et al. | Aug. 8, 1939 |
| 2,214,050 | Fowler | Sept. 10, 1940 |
| 2,512,314 | Dutton | June 20, 1950 |
| 2,705,437 | Lessman | Apr. 5, 1955 |

UNITED STATES PATENT OFFICE
CERTIFICATE OF CORRECTION

Patent No. 3,007,370                              November 7, 1961

Archie J. McMaster et al.

It is hereby certified that error appears in the above numbered patent requiring correction and that the said Letters Patent should read as corrected below.

Column 1, line 59, for "arrenged" read -- arranged --; column 3, line 31, for "interefre" read -- interfere --; line 33, for "proejction" read -- projection --; column 4, lines 49 and 50, strike out, "having two longitudinally extending surfaces which intersect at an outwardly opening angle --.

Signed and sealed this 15th day of May 1962.

(SEAL)
Attest:

ERNEST W. SWIDER
Attesting Officer

DAVID L. LADD
Commissioner of Patents